United States Patent
Su

(10) Patent No.: US 10,834,407 B2
(45) Date of Patent: Nov. 10, 2020

(54) SDR BIT DEPTH ENHANCEMENT VIA CODEWORD RANGE AMPLIFICATION IN A CODEC WITH INVERSE DISPLAY MANAGEMENT

(71) Applicant: Dolby Laboratories Licensing Corporation, San Francisco, CA (US)

(72) Inventor: Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 352 days.

(21) Appl. No.: 15/747,332

(22) PCT Filed: Jul. 26, 2016

(86) PCT No.: PCT/US2016/044102
§ 371 (c)(1),
(2) Date: Jan. 24, 2018

(87) PCT Pub. No.: WO2017/019704
PCT Pub. Date: Feb. 2, 2017

(65) Prior Publication Data
US 2018/0376146 A1    Dec. 27, 2018

Related U.S. Application Data

(60) Provisional application No. 62/198,073, filed on Jul. 28, 2015.

(51) Int. Cl.
*H04N 19/159* (2014.01)
*H04N 19/30* (2014.01)
(Continued)

(52) U.S. Cl.
CPC ......... *H04N 19/159* (2014.11); *H04N 19/103* (2014.11); *H04N 19/117* (2014.11);
(Continued)

(58) Field of Classification Search
CPC ........................ H04N 19/159; H04N 19/103
See application file for complete search history.

(56) References Cited

U.S. PATENT DOCUMENTS 8,391,353 B2    3/2013  Yin
8,798,149 B2    8/2014  Wu
(Continued)

FOREIGN PATENT DOCUMENTS

CN    101916440    12/2010
EP    2858369    4/2015
(Continued)

OTHER PUBLICATIONS

Miao, D. et al "Layered Compression for High Dynamic Range Depth" IEEE on Visual Communications and Image Processing, Nov. 27-30, 2012.
(Continued)

*Primary Examiner* — William C Vaughn, Jr.
*Assistant Examiner* — Jerry T Jean Baptiste

(57) ABSTRACT

Novel methods and systems for encoding standard dynamic range video to improve the final quality after converting standard dynamic range video into enhanced dynamic range video are disclosed. A dual layer codec structure that amplifies certain codeword ranges can be used to send enhanced information to the decoder in order to achieve an enhanced (higher bit depth) image signal. The enhanced standard dynamic range signal can then be up-converted to enhanced dynamic range video without banding artifacts in the areas corresponding to those certain codeword ranges.

14 Claims, 13 Drawing Sheets

(51) Int. Cl.
*H04N 19/117* (2014.01)
*H04N 19/17* (2014.01)
*H04N 19/103* (2014.01)
*H04N 19/184* (2014.01)

(52) U.S. Cl.
CPC .......... *H04N 19/17* (2014.11); *H04N 19/184* (2014.11); *H04N 19/30* (2014.11)

(56) References Cited

U.S. PATENT DOCUMENTS

| | | |
|---|---|---|
| 9,497,456 B2 | 11/2016 | Su |
| 9,549,207 B2 | 1/2017 | Su |
| 9,607,364 B2 | 3/2017 | Xu |
| 2013/0329778 A1* | 12/2013 | Su .................. H04N 19/132 375/240.01 |
| 2016/0269740 A1* | 9/2016 | Choi .................. H04N 19/30 |
| 2016/0360215 A1* | 12/2016 | Rusanovskyy .... H04N 19/1887 |

FOREIGN PATENT DOCUMENTS

| | | |
|---|---|---|
| WO | 2012/125802 | 9/2012 |
| WO | 2013/067113 | 5/2013 |
| WO | 2014/052292 | 4/2014 |
| WO | 2014/099370 | 6/2014 |
| WO | 2014/160705 | 10/2014 |
| WO | 2014/163793 | 10/2014 |
| WO | 2014/165401 | 10/2014 |
| WO | 2015/077329 | 5/2015 |

OTHER PUBLICATIONS

Liu, S. et al "Bit-Depth Scalable Coding for High Dynamic Range Video" Visual Communications and Image Processing, vol. 6822, Jan. 29-31, 2008, pp. 682200-1-682200-10.

Lauga, P. et al "Segmentation-Based Optimized Tone Mapping for High Dynamic Range Image and Video Coding" IEEE Picture Coding Symposium, Dec. 8, 2013, pp. 257-260.

Ziliani, Francesco "Spatio-Temporal Image Segmentation: A New Rule-Based Approach" These Presente Au Department D'Electricite Ecole Polytechnique Federale De Lausanne, Nov. 1, 2000.

* cited by examiner

SDR BIT DEPTH ENHANCEMENT VIA CODEWORD RANGE AMPLIFICATION IN A CODEC WITH INVERSE DISPLAY MANAGEMENT

CROSS-REFERENCE TO RELATED APPLICATIONS

This application claims priority from U.S. Provisional Patent Application No. 62/198,073 filed Jul. 28, 2015, which is hereby incorporated by reference in its entirety.

TECHNICAL FIELD

The present disclosure relates to improvements for up-converting standard dynamic range (SDR) video to enhanced dynamic range (EDR) video. More particularly, it relates to methods and systems for SDR bit depth enhancement.

BACKGROUND

Display technologies being developed by Dolby Laboratories, Inc., and others, are able to reproduce images having high dynamic range (HDR). Such displays can reproduce images that more faithfully represent real-world scenes than conventional displays characterized by approximately three orders of magnitude of dynamic range (e.g., standard dynamic range-"SDR").

Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those people whose HVS has a time period in which to reset and adjust.

In contrast, the DR over which a human may simultaneously perceive an extensive breadth in intensity range may be somewhat truncated, in relation to HDR. As used herein, the terms 'enhanced dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. In the present application, VDR and EDR are intended to indicate any extended dynamic range which is wider than SDR and narrower or equal to HDR.

To support backwards compatibility with existing 8-bit video codecs, such as those described in the ISO/IEC MPEG-2 and MPEG-4 specifications, as well as new HDR display technologies, multiple layers may be used to deliver HDR video data from an upstream device to downstream devices. In one approach, generating an 8-bit base layer version from the captured HDR version may involve applying a global tone mapping operator (TMO) to intensity (e.g., luminance, luma) related pixel values in the HDR content with higher bit depth (e.g., 12 or more bits per color component). In another approach, the 8-bit base layer may be created using an adaptive linear or non-linear quantizer. Given a BL stream, a decoder may apply an inverse TMO or a base layer-to-EDR predictor to derive an approximated EDR stream. To enhance the quality of this approximated EDR stream, one or more enhancement layers may carry residuals representing the difference between the original HDR content and its EDR approximation, as it will be recreated by a decoder using only the base layer.

However, even with the residuals taken into account, the resulting EDR stream may produce artifacts, such as banding or blocks, typically in dark areas and in highlights.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

An inverse display management (iDM) module can convert a SDR image to an EDR image, which is convenient for applications when HDR grade is not available. The iDM metadata can be generated at the encoder side, with metadata for each frame codeword. The inverse DM module can take this iDM metadata to up-convert SDR to EDR. Previously, the up-converted EDR image would have banding artifacts in tonally smooth areas (such as in shadow or bright light) due to the iDM process. In order to produce a higher quality SDR to EDR conversion, the SDR needs to be enhanced prior to the iDM process. A dual layer codec structure can be used to send enhanced information to the decoder in order to achieve an enhanced (higher bit depth) SDR, referred to herein as "SDR+".

An embodiment for achieving SDR+ first detects the smooth areas (which potentially have contouring artifacts), and determines the codeword range to be amplified. Then, the system can generate a prediction mapping which clips the required codeword range and encodes the difference in one or more enhancement layers (EL), each of which having a much less quantization distortion and higher codeword range for the areas of interest (smooth areas). Each EL contains a quantized difference from the SDR signal with added quantization and compression distortion.

Banding artifact areas often happen in the highlight and/or dark areas. These banding areas can be clipped as constant surfaces and encoded as the difference between the original 16-bit data and a constant value. Since the clipped areas in the base layer (BL) has a narrowed range of codewords, the small difference (but in higher bit depth) will be re-quantized with the enhancement layer (EL) codewords resulting in less quantization distortion, and therefore less contouring artifacts. The EL will be as smooth as the original data in those areas, which should be easier to encode. This will be referred to as codeword range amplification (CRA), because it deals with amplifying a small codeword range in the BL to entire full range in the corresponding EL. Both the BL and the composed BL+EL are viewable SDR with the CRA method.

The CRA method can significantly reduce both banding artifacts and blocky artifacts for the inverse DM application. First, smooth areas (areas that potentially have contouring artifacts) are detected and the codeword range to be amplified is determined. Then, a prediction mapping is generated which clips the required codeword range and encodes the difference in EL, which has much higher dynamic range in the interested areas.

The CRA method can be used for dark areas, bright (highlight) areas, or both dark and bright areas.

DETAILED DESCRIPTION

Inverse Dynamic Mapping

Figure 1:
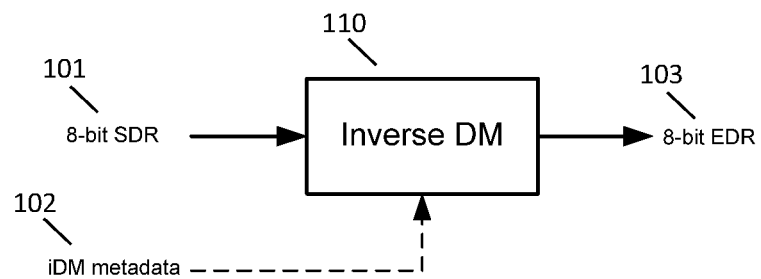
FIG. 1 illustrates an example prior art inverse DM workflow.

FIG. 1 shows the prior art inverse DM workflow. Given an 8-bit SDR bit input stream (101), the inverse DM module (110) uses metadata (102) to up-convert the input 8-bit SDR to an 8-bit EDR output (103). The inverse mapping of the 8-bit SDR to the higher dynamic range might cause some banding artifacts. This happens when the codeword difference between two nearby codewords exceeds a just noticeable difference (JND) in the EDR domain post inverse tone mapping (for example, a 50% JND). The inverse DM is a process to map the SDR content to EDR content, without a loss of generality, and any inverse mapping or prediction function can be used to perform the inverse DM and metadata for inverse DM (iDM metadata) can be utilized to facilitate this process.

Figure 2:
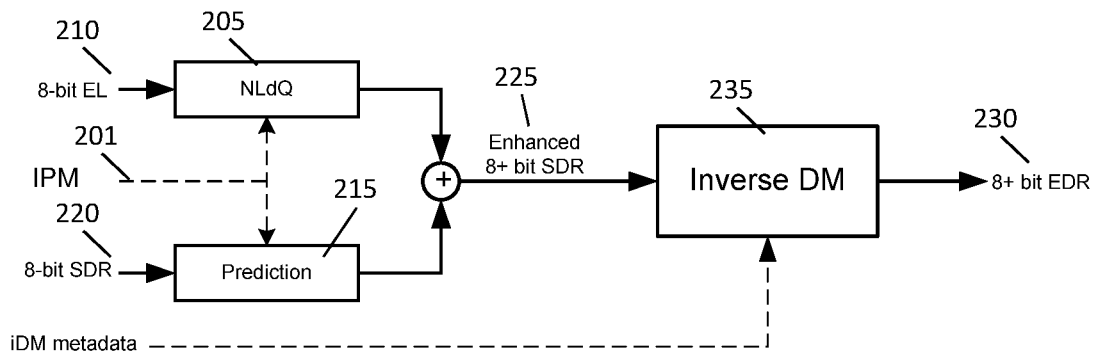
FIG. 2 illustrates an example inverse DM workflow for CRA.

FIG. 2 shows an embodiment of the inverse DM workflow that utilizes CRA to produce an improved EDR stream (230) from a base layer (BL) SDR stream (220) that has an accompanying EL stream (210), both compressed, and inter-layer predictor metadata (IPM) (201) comprising parameters transmitted from an encoder to the decoder to assist in the decoding process. Examples of IPM can include coefficients of a prediction polynomial and/or quantization parameters for proper inverse quantization in a non-linear de-quantizer. The workflow can then use the IPM (201) to enable a non-linear de-quantizer (NLdQ) module (205) to convert the EL stream (210) and to enable a prediction module (215) to convert the SDR stream so that the combined converted SDR and EL produces an enhanced SDR+ stream (225) for the inverse DM module (235). The resulting EDR stream has reduced incidence of banding and blocky artifacts when compared to the prior art inverse DM workflow of FIG. 1.

Codeword Range Amplification

A. The Encoder

Figure 3:
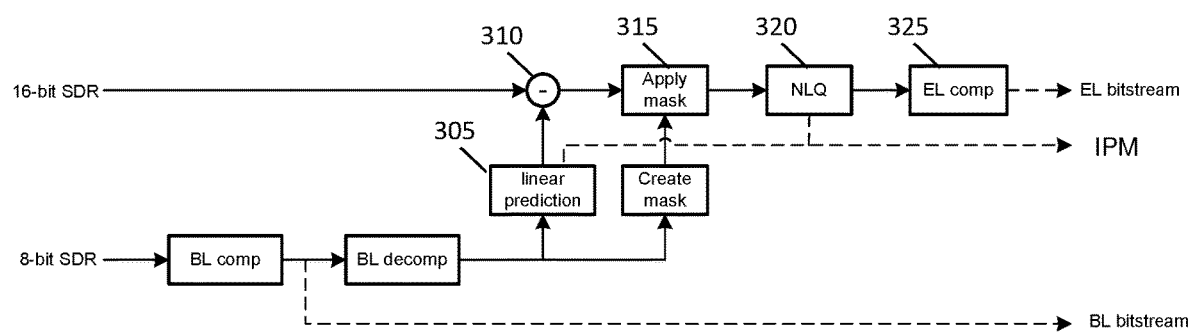
FIG. 3 illustrates an example BL/EL/IPM creation for CRA.

In order for the inverse DM workflow to utilize CRA, it requires a base layer (BL) stream (compressed SDR), an accompanying EL stream, and accompanying IPM. One system for producing these from a source SDR is shown in FIG. 3.

In this example architecture, the predictor (305) for 8-bit SDR to 16-bit SDR is a linear predictor. The residual (310) is the difference between the original 16 bit SDR data and the decompressed 8-bit SDR data. Thus, the pre-mask residual would be the least significant (LSB) 8 bits if the BL is created through lossless compression of the 8-bit SDR.

Since the residual is the LSB 8 bits, it contains a lot of high frequency information that is normally discarded for state-of-the-start lossy video compression. Therefore, in order to encode this type of residual, a very high bit rate is needed to preserve those high frequency components. Given a limited bit budget for the output stream, it is advantageous to only encode certain areas with additional residual, ignoring other less critical areas. Thus, a residual mask (315) can be applied prior to the non-linear quantization (NLQ) (320). After quantization, the EL stream can be compressed (325) before being sent to the inverse DM workflow.

Figure 4:
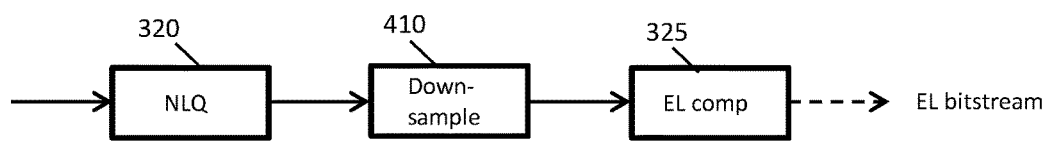
FIG. 4 illustrates an example inclusion of down-sampling in the system of FIG. 3.

Optionally, the EL stream can be down-sampled (410) before compression (325) to further reduce the bit rate, for example as shown in FIG. 4.

B. Prediction

Figure 5A:
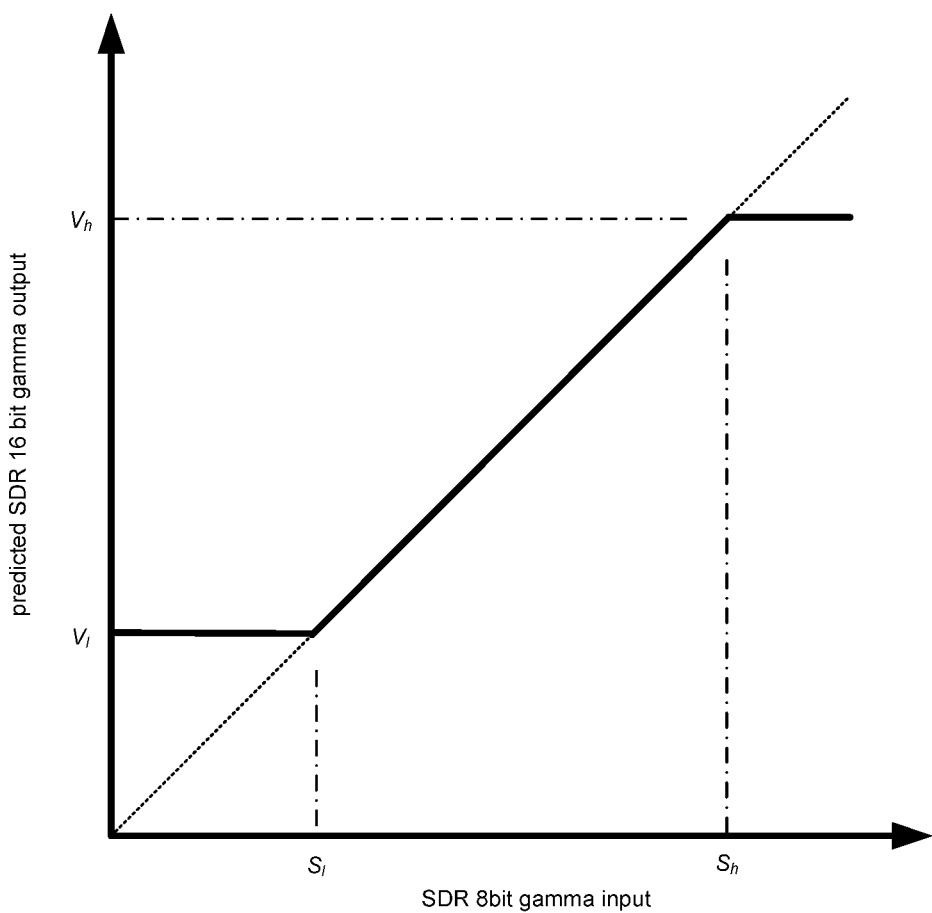
FIGS. 5A-5D illustrate example clipping graphs.
Figure 5B:
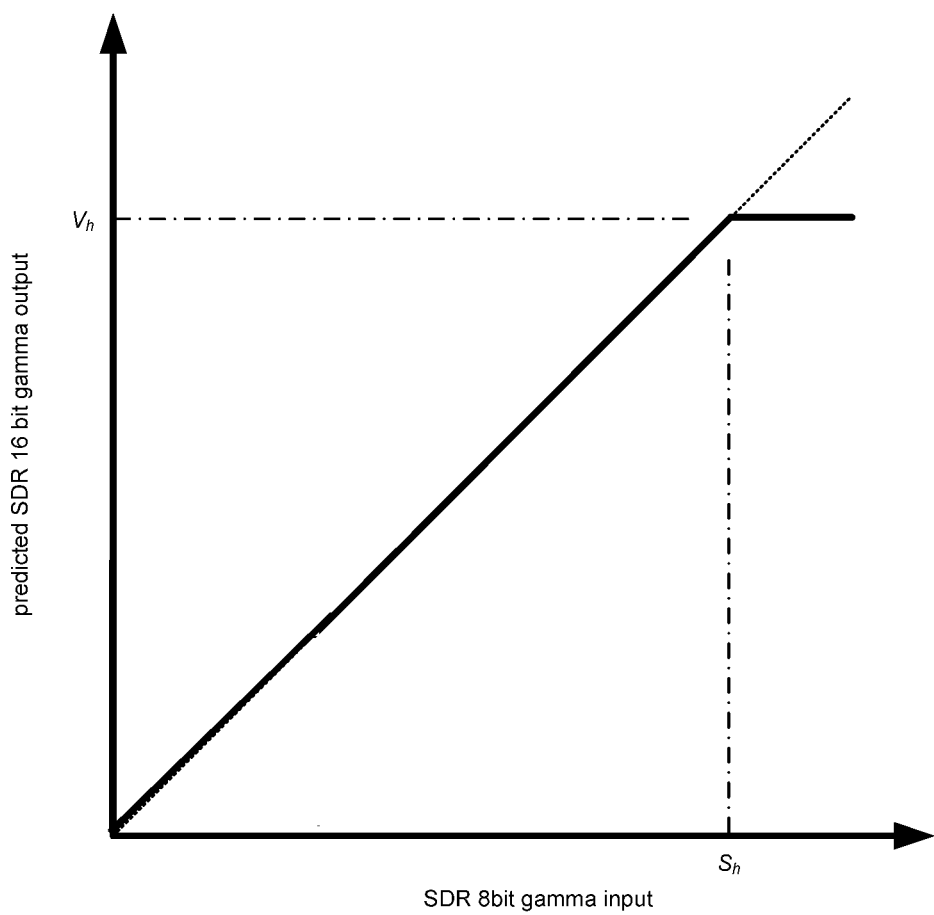
Figure 5C:
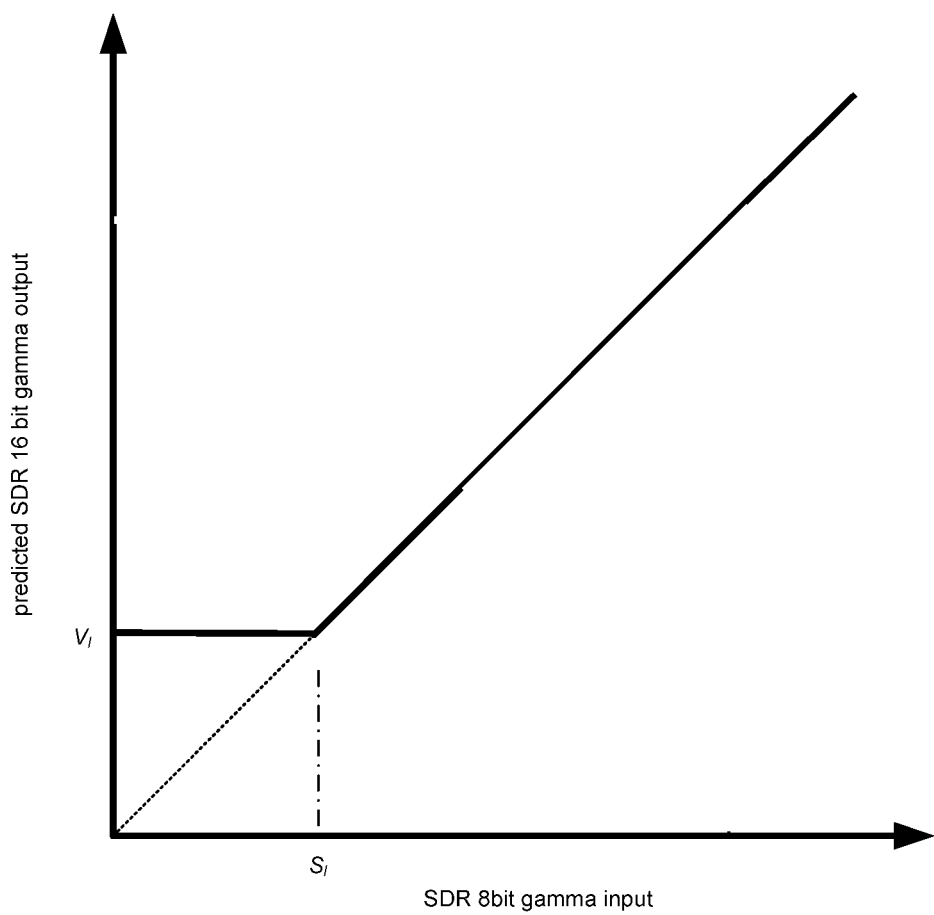
Figure 5D:
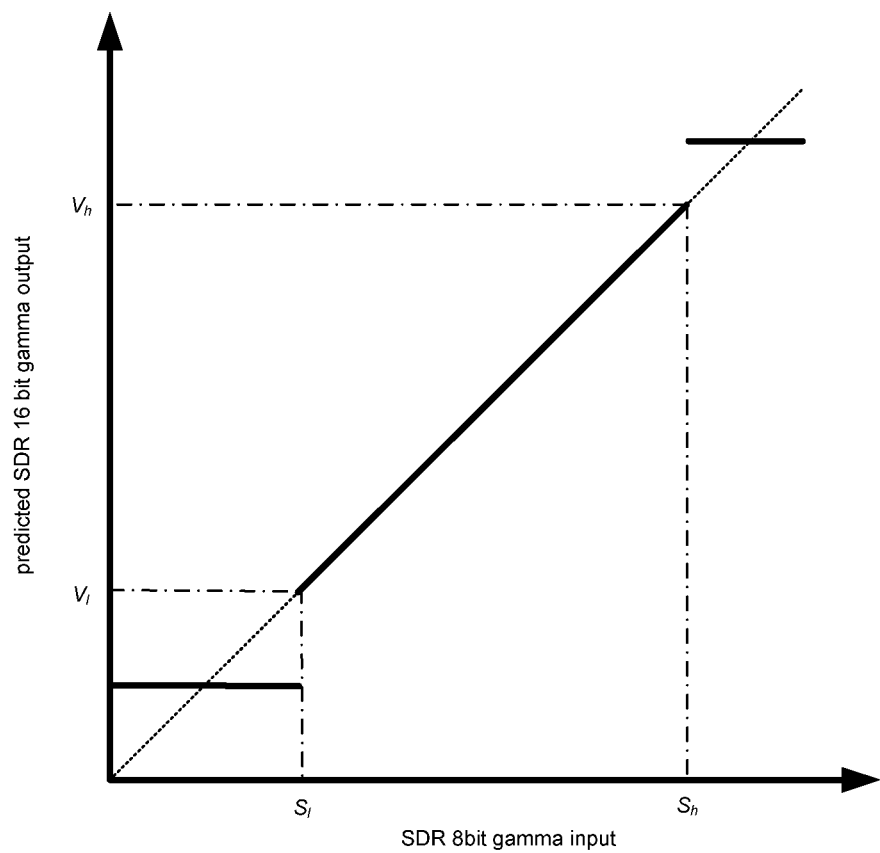

For a selected narrow range in the SDR (8-bit), constant predictor coefficients can be created. In this way, all codewords within this narrow range map to a constant value. The difference between the original 16-bit SDR data and this constant value can be encoded in the EL. By doing so, the EL data in the clipped areas is the original high bit depth SDR image ("natural image") minus a constant, so it is still smooth and easy to encode. Examples are shown in FIGS. 5A-5D. FIG. 5A shows clipping at both high ($S_h$) and low ($S_l$) codeword values, FIG. 5B shows clipping at high ($S_h$) codeword values, FIG. 5C shows clipping at low ($S_l$) codeword values, and FIG. 5D shows a modified version of clipping for both high ($S_h$) and low ($S_l$) codeword values.

The predictor can clip the SDR at value higher than $S_h$ and/or at value a smaller than $S_l$. For example, setting $S_l$ as 32 and $S_h$ as 256 will cause all pixels in the BL having value no larger than 32 to be clipped. The difference between the original value and the clipped constant value will be re-encoded in EL, which has 256 codewords. In other words, the pixels which have 8+ bit depth and are quantized using 5 bits in BL are now quantized using 8 bits in EL. Therefore, the quantization error is reduced by the extra 3 bits. Thus, contouring artifacts are reduced.

Denote the $i^{th}$ pixel in 16-bit SDR images as $v_i$ and the $i^{th}$ pixel in the 8-bit SDR image as $s_i$. In one embodiment, both $v_i$ and $s_i$ are normalized to have values between [0 1). The predictor which performs the clipping can be expressed by the following equation:

$$\hat{s}_i = \text{clip3}(s_i, S_l, S_h)$$

where $b=\text{clip3}(\alpha, L, H)$ is an operator which restricts the value of $\alpha$ between the values of L and H. For example, in the C programing language, clip3( ) may be implemented as:

$$b=(a<L)?L:((a>H)?H:a).$$

In another embodiment, a piecewise polynomial can be used to implement the clip3 operation.

Set pivot point $pv_1=S_l$ and $pv_2=S_h$. The first segment of polynomial $\{a_{0,0}\}$ is a constant with value $V_l$. The second segment of polynomial is a 1st order polynomial $\{a_{1,0}, a_{1,1}\}=\{0, 1\}$. The third segment of polynomial $\{a_{2,0}\}$ is a constant with value $V_h$. An example program for applying segment values is given in Program 1.

Program 1

If $(s_i<S_l)$ $\hat{s}_i=S_l$

Else if $((s_i>=S_l)\&\&(s_i<S_h))$ $\hat{s}_i=s_i$

Else $\hat{s}_i=S_h$

Modified Prediction

For the case of low and high clipping together, a special modification can be used for some situations. When the required amplified range is small on both sides, the low clipping areas encoded can be encoded as negative values in the residual and high clipping areas as positive values. However, when the required amplified range is large for both low and high clipping, the EL quantizer will become coarse and less effective to alleviate banding artifact. In this case the predictor can be modified so both the low clipping areas and high clipping areas have sufficient codewords.

FIG. 5D shows an example modification of the predictor. Constant values are used for the dark (less than $S_l$) and light (greater than $S_h$) areas. Denote $S_{min}$ and $S_{max}$ as the minimal and maximal values in 8-bit SDR for a given scene. For the low clipping areas, the predictor can be set as $$\hat{s}_i = a_{00} = \frac{1}{2}(S_l + S_{min})$$

By doing so, the residual will have both positive and negative values. For the high clipping areas, the predictor can be set as $$\hat{s}_i = a_{20} = \frac{1}{2}(S_h + S_{max})$$

C. Residual Mask

A residual mask can be applied on the residual. Those pixels whose BL values are within $S_l$ and $S_h$, are not to be encoded in the EL. Only the pixels having BL value below $S_l$ or above $S_h$ are encoded:

$$r_i=((s_i \geq S_l)\&\&(s_i \leq S_h))?0:(v_i\hat{s}_i)$$

NLQ Parameters

The NLQ parameter can be selected as follows.

The residual of the $i^{th}$ pixel in frame f (having p pixels) can be denoted as $r_{fi}$ and the maximal positive residual value in frame f can be denoted as $X_f^+$ and the absolute value of the minimal negative residual value in frame f can be denoted as $X_f^-$.

$$X_f^+=\max\{r_{fi}|i=0,\ldots,p-1\}$$

$$X_f^-=|\min\{r_{fi}|i=0,\ldots,p-1\}|$$

For a scene with F frames, find the maximal value of $X_f^+$ among all F frames and maximal value of $X_f^-$ among all F frames.

$$X^+=\max\{X_f^+|f=1,\ldots,F\}$$

$$X^-=\max\{X_f^-|f=1,\ldots,F\}$$

For an 8-bit EL codec, the NLQ setting for the entire scene can be adjusted as $$\text{Offset} = (2^{EL\_bitdepth} - 1)\frac{X^-}{X^- + X^+}$$

$$\text{Level} = \max\{(2^{EL\_bitdepth} - 1) - \text{Offset}, \text{Offset}\}$$

$$X_{MAX} = (1 + \Delta)\max\{X^-, X^+\}$$

D. Inverse S-Curve Tone Mapping (Inverse DM)

Figure 6:
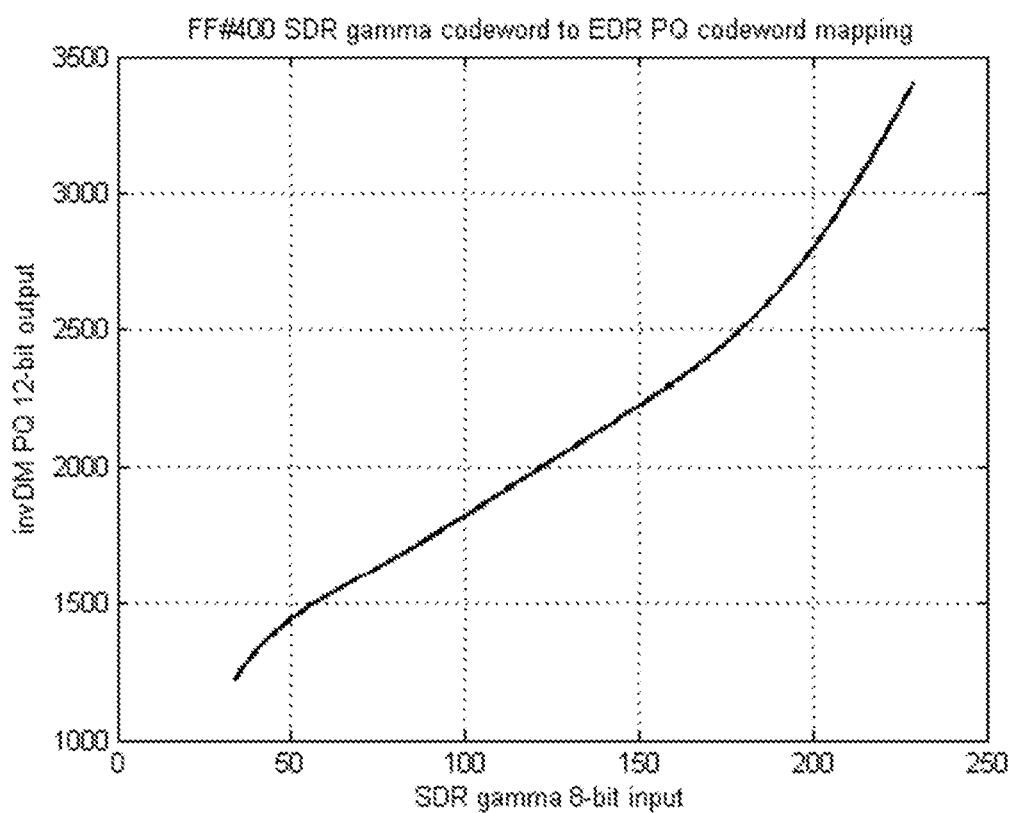
FIG. 6 illustrates an example inverse S-curve mapping graph.

An S curve used for forward tone mapping compresses the codewords in the highlight and dark areas. Regarding the generation of a tone mapping curve for display management, an example algorithm is described in PCT Patent Publication WO 2012/125802, "Method and Apparatus for Image Data Transformation," which is incorporated herein by reference in its entirety. For forward tone mapping, the slopes on the curve are steeper in highlight and dark areas than the slopes in the mid-tone areas. FIG. 6 shows an example inverse S curve, which has the opposite characteristics of an S-curve in that the slopes in the highlight and dark areas are steeper than the slopes in the mid-tone areas. Thus, a small codeword difference in the dark/highlight areas in SDR domain will result in big difference in the EDR domain after inverse S curve mapping. An example of inverse tone mapping can be found in PCT patent publication WO 2015/077329 incorporated herein by reference.

Frame-Level Pivot Point Selection in CRA

In the inverse DM method with CRA, the banding residual between the 16-bit SDR and 8-bit SDR is reduced. A detector and range finder is described:

Assume the input image has dimension W×H.

Step 1: Detect Smooth Areas

Divide the input image into multiple non-overlapping small blocks with dimension N×N. For example, (W/N)×(H/N) blocks. Then, detect the smooth areas by checking the smoothness measurement in each block. One example of smoothness detection is to check the difference between the maximal value and the minimal value in each block.

Denote the $i^{th}$ block at frame j as $B_{ij}$ and the $k^{th}$ pixel inside this block as $s_{kij}$. The smoothness measurement for this block can be defined as the maximal value minus the minimal value:

$$(\max_{s_{kij} \in B_{ij}} s_{kij}) - (\min_{s_{kij} \in B_{ij}} s_{kij})$$

Use a binary indicator $h_{ij}$ to tell whether a block is smooth enough, namely, the smoothness measurement is smaller than a threshold, $T_s$. (example values are 4 or 5).

$$h_{ij} = ((\max_{s_{kij} \in B_{ij}} s_{kij}) - (\min_{s_{kij} \in B_{ij}} s_{kij})) \le T_s)$$

For each picture, construct a 2D image with element $h_{ij}$. Denote this binary image as $H_j$.

Step 2: Connect Smooth Areas

The smooth areas detected from the previous step might be scattered around. A morphological operator can be used to link them together. The following is an example morphological operator comprising an erode and a close function, but any hole-closing operator can be used:

MorphMask$_j$=morphological_erode (morphological_close($H_j$))

Then, scale this binary mask with dimension (W/N)×(H/N) back to its original dimension (W×H). Denote this re-scaled mask as $M_j$. The elements inside the mask is vectorized and denoted $m_{kj}$, where k is in [0, 1, 2, . . . W×H−1]. A value of 0 for mask pixel $m_{kj}$ means it is not considered to be within the smooth areas, and a value of 1 means it is inside the smooth areas.

Step 3: Histogram of Non-Zero 8-Bit SDR Pixels Inside Smooth Areas

Calculate the histogram for those non-zero value 8-bit SDR pixels inside the smooth areas. An example program is provided in Program 2. Denote the histogram as $g_j[\ ]$. After having this histogram, clean up the small value entry. First, obtain the average value of non-zero entries.

$$\overline{G}_j = \frac{\sum_{i=0}^{2^{BL\_bit\_depth}-1} g_j[i]}{\sum_{i=0}^{2^{BL\_bit\_depth}-1} (g_j[i] > 0)}$$

If $g_j[\ ]$ is smaller than $T_h \overline{G}_j$, reset this entry to 0.

$g_j[i]=(g_j[i] \ge T_h \cdot \overline{G}_j)?g_j[i]:0$

A typical value of $T_h$ is 0.5.

Another round of median filter (5 taps) can be performed to remove noise in the histogram:

$\hat{g}_j[i]$=medfilt($g_j[i]$)

Program 2

```
// create histogram
g_j[ 0 : 1 : 2^BL_bit_depth - 1 ] = 0;
For k = 0 : 1 : WxH
    If( (m_kj > 0) && ( s_kj > 0 ) )
        g_j[ s_kj ] ++;
    end
end
// calculate average value for non-zero histogram elements
hist_sum = 0;
hist_cnt = 0;
for i = 0 : 1 : 2^BL_bit_depth - 1
    if( g_j[ i ] > 0 )
        hist_sum += g_j[ i ];
        hist_cnt ++;
    end
end
hist_ave = hist_sum / hist_cnt;
// clean up small elements
for i = 0 : 1 : 2^BL_bit_depth - 1
    if( g_j[ i ] < hist_ave )
        g_j[ i ] = 0;
    end
```

```
end
// medium filter
for i = 0 : 1 : 2^BL_bit_depth - 1
    ĝ_j[i] = medfilt(g_j[i])
End
```

Step 4: Generate Histogram Clusters

There might be several clusters in the histogram. Consider an example where multiple clusters appear. Subject to a limited codeword size in EL, only a certain range from the histogram for codeword range amplification can be selected. The largest cluster, for example, can be selected as the focus area for CRA.

The clusters can be collected by checking whether the values of two nearby filtered histograms, and $\hat{g}_j[i]$ and $\hat{g}_j[i-1]$, are toggled. An example program is shown in Program 3.

Program 3

```
cluster_sum = 0;
cluster_start[ ] = 0;
cluster_end[ ] = 0;
cluster_cnt[ ] = 0;
cluster_num = -1;
for( i = 1 ; i < 2^BL_bit_depth ; i ++ )
    if( ( ĝ_j[i] != 0 ) && ( ĝ_j[i - 1] == 0 ) ) // enter a new cluster
        cluster_num ++;
        cluster_start[ cluster_num ] = i;
        cluster_sum[ cluster_num ] += ĝ_j[i];
        cluster_cnt[ cluster_num ] = 1;
    elseif( ( ĝ_j[i] == 0 ) && ( ĝ_j[i - 1] != 0 ) ) // leave a cluster
        cluster_end[ cluster_num ] = i - 1;
    elseif( ( ĝ_j[i] != 0 ) && ( ĝ_j[i - 1] != 0 ) ) // within a cluster
        cluster_cnt[ cluster_num ] ++;
    end
end
```

Step 5: Select the Pivot Points from Largest Cluster

If there is no cluster generated from the previous step, then there is no clipping needed (thus, no EL). If there are multiple clusters, the largest cluster can be selected. Other criteria can be also used for selecting the cluster. If the codeword range is narrow, then clipping can be skipped as unneeded. Assume cluster L is the largest cluster. The starting entry for this cluster is cluster_start[L] and the ending entry is cluster_end[L]. An example program is provided in Program 4.

Also obtain the max ($S_{max}$) and min ($S_{min}$) value in the entire image, as well as the medium value:

$S_{med}=(S_{max}+S_{min})/2$;

Program 4

```
If( cluster_cnt[L] < T_c )  //
    S_l = 0
    S_h = 2^BL_bitPdepth - 1
else
    if( cluster_end[L] < S_med )           // low clipping
        S_l = cluster_end[L]
        S_h = 2^BL_bitPdepth - 1
    elseif( cluster_start[L] > S_med )      // high clipping
        S_l = 0
        S_h = cluster_start[L]
    else
        S_l = 0
        S_h = 2^BL_bitPdepth - 1
    end
end
```

$T_c$ can be set to 4, for example.

Scene-Level Pivot Point Selection in Codeword Range Amplification

At the scene level, maintain the same clipping value for all frames to ensure the coding efficiency in EL. A majority vote method can be used.

If high clipping is needed, choose the minimal value of $S_h$.
If low clipping is needed, choose the maximal value of $S_l$.

Summary of Codeword Range Amplification Method

An example procedure for bit depth enhancement is described below:
1) Find frame-level and scene-level clipping thresholds
2) Change the prediction curves using the clipping thresholds.
3) Output interlayer predictor metadata (IPM).
4) Perform prediction to get predicted 16-bit SDR using clipped prediction $$\hat{s}_i = \text{clip3}(s_i, S_l, S_h)$$

5) Obtain residual between the original 16-bit SDR and the predicted SDR and apply the residual mask $$r_i = ((s_i \geq S_l) \& \& (s_i \leq S_h))?(v_i - \hat{s}_i):0$$

6) Quantize the EL and compress EL as EL bitstream.

Multi-Layer Architecture

When the required codeword range is big, say, over 128 codewords, the amplification might not be sufficient to overcome the banding artifact since it just re-quantized the 7-bit data in BL by an 8-bit quantizer in EL, and this is equivalent to 9 bit data precision. To overcome this problem, multiple EL architecture can be used. Optionally, the multiple layer of EL can be laid out in one big plane and can be encoded with just one codec.

The multi-layer architecture works in the following way: take low clipping as an example. The prediction has the same operation:

$$\hat{s}_i = \text{clip3}(s_i, S_l, S_h)$$

The difference for pixels having codeword in BL less than Si and the original high bit depth value is encoded in all ELs.

$$r_i = ((s_i \geq S_l) \& \& (s_i \leq S_h))?(v_i - \hat{s}_i):0$$

This amount of residual can be further low clipped into multiple BLs. For 2-layer EL, set a new threshold $S_{l2}$, where $S_{l2} < S_l$.

In the first EL, $$r_i^{(EL1)} = ((s_i \geq S_{l2}) \& \& (s_i < S_l))?(v_i - S_l):0$$

In the second EL, $$r_i^{(EL2)} = (s_i < S_{l2})?(v_i - S_{l2}):0$$

For example, if $S_l = 128$ and $S_{l2} = 64$, then EL1 will cover the pixels with codeword range in BL as 64~128 (6 bit precision); and EL2 will cover the pixels with codeword range in BL as 0~63 (6 bit precision). The difference between the original high bit depth data and the clipped prediction value can be encoded as 8 bit codec range. The original 6 bit precision in BL can be amplified using 8-bit precision in EL with new data from original high bit depth video. Thus, the banding artifact can be further reduced.

High Clipping can be Also Done in a Similar Manner

Multiple ELs can be either encoded in multiple encoders, so each layer has its own codec; or multiple ELs can be arranged as side by side in one single video plane and encode them using one codec but with multiple time dimensions. The decoding can be done in a similar manner.

The constant-value areas should be easier encode and should require a reduced number of bits. The most of the bits will be spent on the clipped regions, which are high bit depth (i.e. original image quality).

Codeword Range Amplification in Arbitrary Areas (Mid-Tone)

Sometimes the banding areas occur in the mid-tone. This codeword range can be amplified in the similar manner as dual-end case.

First, partition the SDR range into K segments, which are partitioned by pivot points, pv0, pv1, pv2, ... pvK. Those pivot points should cover the range of interest to be amplified. For example, pvk and pvk+1 are the minimal and maximal SDR values for the kth segment to be amplified, respectively.

The predictor for a segment of interest can be set as a constant, for example:

$$\hat{s}_i = a_{k0} = \frac{1}{2}(pv_k + pv_{k+1})$$

otherwise (outside the segment of interest), a default predictor can be used:

$$\hat{s}_i = s_i$$

It is possible to further partition a range into several small ranges, so each range can be amplified further.

Example 1—Low Codeword Clipping

FIGS. 7A-7G show an example of CRA with clipping for low codeword values.

Figure 7A:
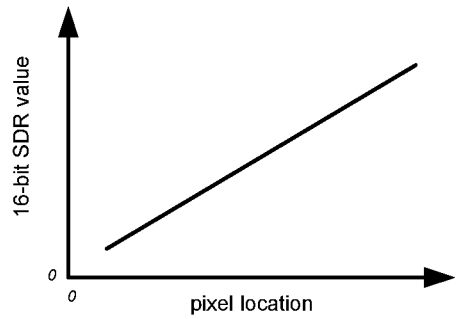
FIGS. 7A-7G illustrate an example low codeword threshold CRA method.

FIG. 7A shows the initial 16-bit SDR values with respect to pixel location.

Figure 7B:
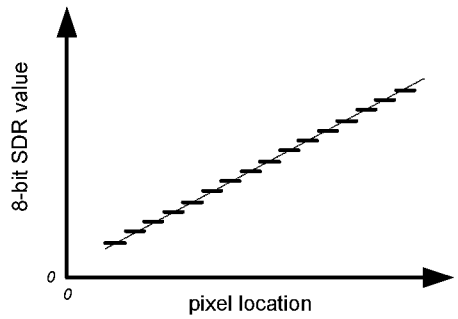

FIG. 7B shows the 8-bit SDR values with respect to pixel location. The quantized 8-bit SDR signal is generated from the original 16-bit SDR and this 8-bit SDR will be compressed in the BL encoder.

Figure 7C:
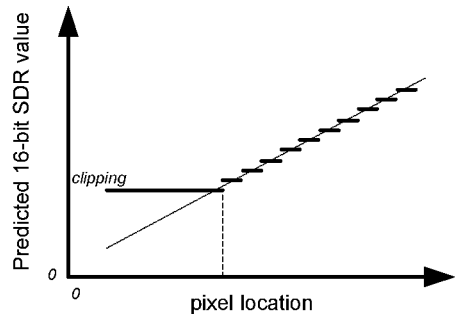

FIG. 7C shows the predicted 16-bit SDR values with respect to pixel location. The prediction module can be a piecewise 2nd-order polynomial. This prediction module can clip the signal below and/or above threshold(s). In this case, it clips a value below a threshold, thus the values become constant within an area (e.g. a dark shadow).

Figure 7D:
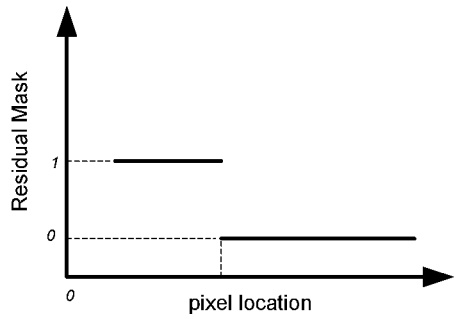

FIG. 7D shows the residual mask value with respect to pixel location. Since enhancement of the BL codeword above the threshold would increase the bit rate beyond what is needed, those areas will be excluded from the EL encoding with this mask (with 1 indicating where the encoding will take place, and 0 indicating where it will not).

Figure 7E:
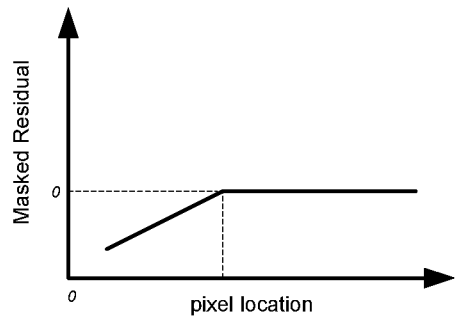

FIG. 7E shows the masked residual with respect to pixel location. After the prediction module, the residual between the original 16-bit SDR and the predicted 16-bit SDR value is obtained. A residual mask can be deployed for the pixels whose SDR value is above the low threshold since codewords within this range do not need more than 8 bits. Setting the residual in this range as 0 can further reduce the bit rate.

Figure 7F:
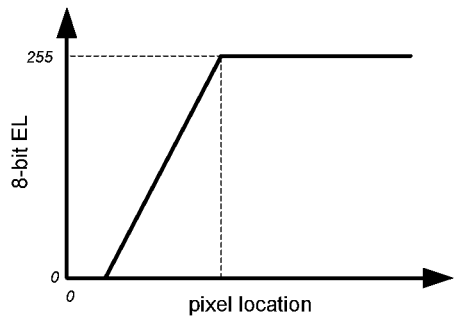

FIG. 7F shows the 8-bit EL with respect to pixel location. The NLQ module can quantize the residual to the maximal available bit depth. In this case, it is 8-bit. In other words, for those low clipped areas, an 8-bit quantizer is used for finer quantization.

Figure 7G:
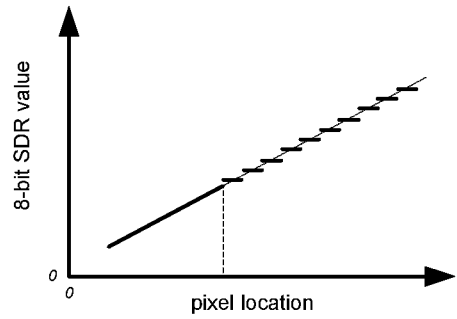

FIG. 7G shows the final composed signal (predicted 16-bit SDR+residual) with respect to pixel location. The finer quantization in the low clipped areas can reach less quantization error, thus reducing banding artifacts in that area.

Example 2—High and Low Codeword Clipping

FIGS. 8A-8G show an example of CRA with clipping for low and high codeword values at the same time.

Figure 8A:
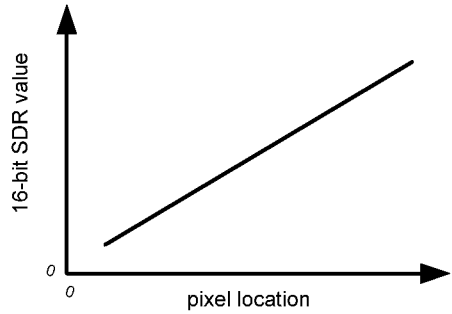
FIGS. 8A-8G illustrate an example low and high codeword threshold CRA method.

FIG. 8A shows the initial 16-bit SDR values with respect to pixel location.

Figure 8B:
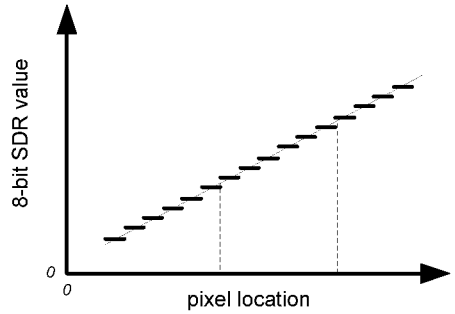

FIG. 8B shows the 8-bit SDR values with respect to pixel location. The quantized 8-bit SDR signal is generated from the original 16-bit SDR and this 8-bit SDR will be compressed in the BL encoder.

Figure 8C:
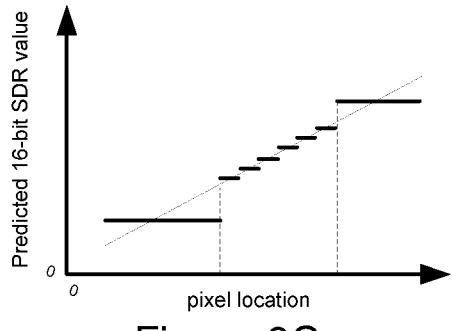

FIG. 8C shows the predicted 16-bit SDR values with respect to pixel location. The prediction module can be a piecewise 2nd-order polynomial. This prediction module can clip the signal below and/or above threshold(s). In this case, it clips a value below a low threshold and above a high threshold, thus the values become constant within two areas, one dark and one light, with one constant value for the dark area and another constant value for the light area.

Figure 8D:
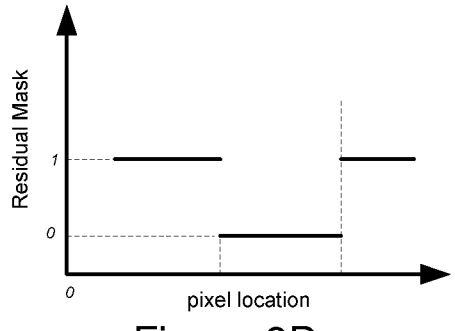

FIG. 8D shows the residual mask value with respect to pixel location. Since enhancement of the BL codeword between the low and high thresholds would add to the bit rate beyond what is needed, those areas will be excluded from the EL encoding with this mask (with 1 indicating where the encoding will take place and 0 indicating where it will not).

Figure 8E:
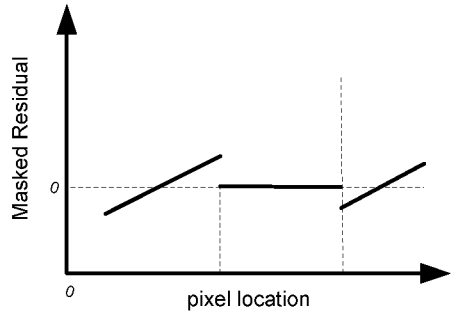

FIG. 8E shows the masked residual with respect to pixel location. After the prediction module, the residual between the original 16-bit SDR and the predicted 16-bit SDR value is obtained. A residual mask can be deployed for the pixels whose SDR value is between the low and high thresholds since codewords within this range do not need more than 8 bits. Setting the residual in this range as 0 can further reduce the bit rate.

Figure 8F:
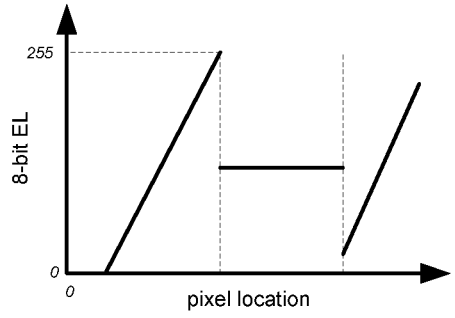

FIG. 8F shows the 8-bit EL with respect to pixel location. The NLQ module can quantize the residual to the maximal available bit depth. In this case, it is 8-bit. In other words, for the two clipped areas, an 8-bit quantizer is used for finer quantization. Note the sharp discontinuities between regions: if a lossy compression is used, other artifacts might be created.

Figure 8G:
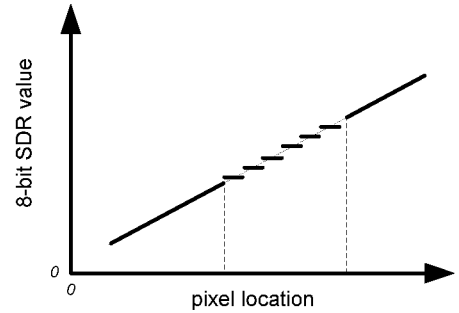

FIG. 8G shows the final composed signal (predicted 16-bit SDR+residual) with respect to pixel location. The finer quantization in the low and high clipped areas can reach less quantization error, thus reducing banding artifacts in those areas.

Hardware

Figure 9:
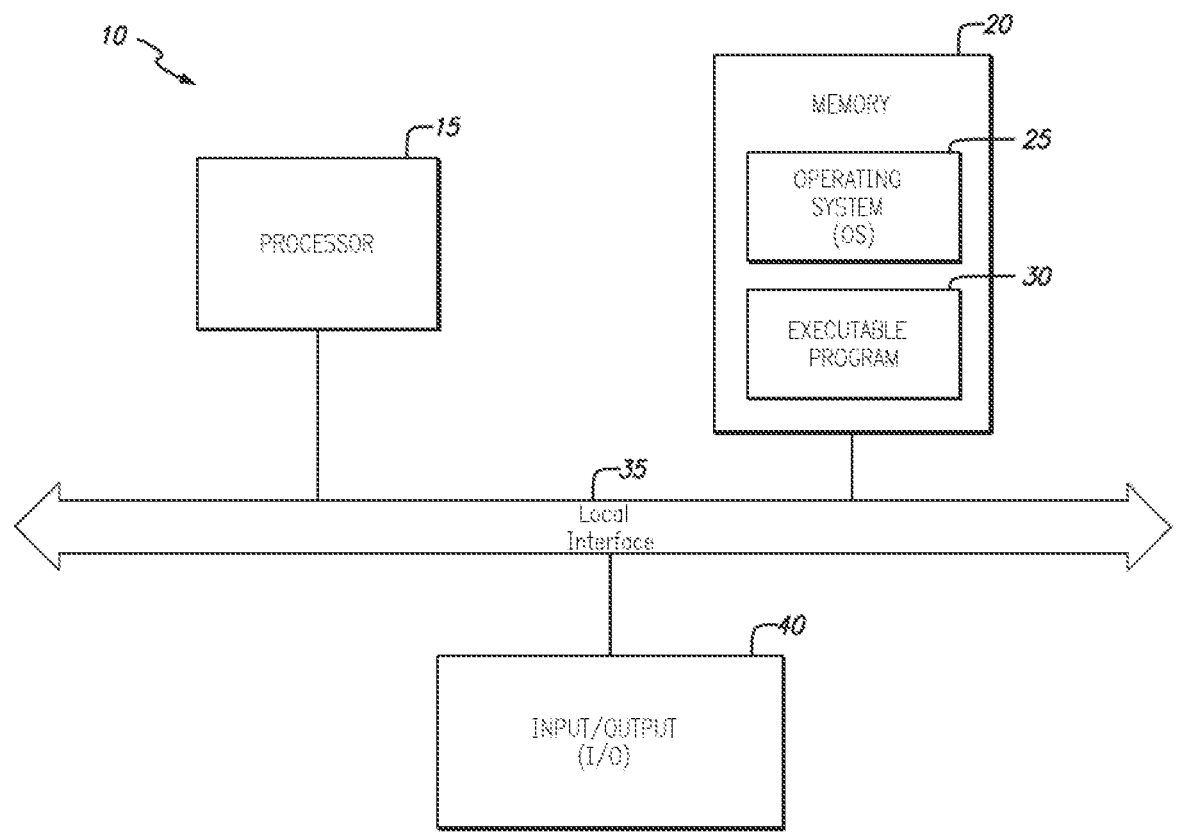
FIG. 9 illustrates example hardware for the CRA method.

FIG. 9 is an exemplary embodiment of a target hardware (10) (e.g., a computer system) for implementing the embodiment of FIGS. 1 to 8G, FIG. 10, and FIG. 11. This target hardware comprises a processor (15), a memory bank (20), a local interface bus (35) and one or more Input/Output devices (40). The processor may execute one or more instructions related to the implementation of FIG. 1 to FIG. 8G, FIG. 10, and FIG. 11 and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 9. In some embodiments a plurality of processors may be used in a parallel configuration for added execution speed. In such a case, the executable program may be specifically tailored to a parallel execution. Also, in some embodiments the processor (15) may execute part of the implementation of FIGS. 1 to 8G, FIG. 10, and FIG. 11 and some other part may be implemented using dedicated hardware/firmware placed at an Input/Output location accessible by the target hardware (10) via local interface (35). The target hardware (10) may include a plurality of executable programs (30), wherein each may run independently or in combination with one another.

Example Process

Figure 10:
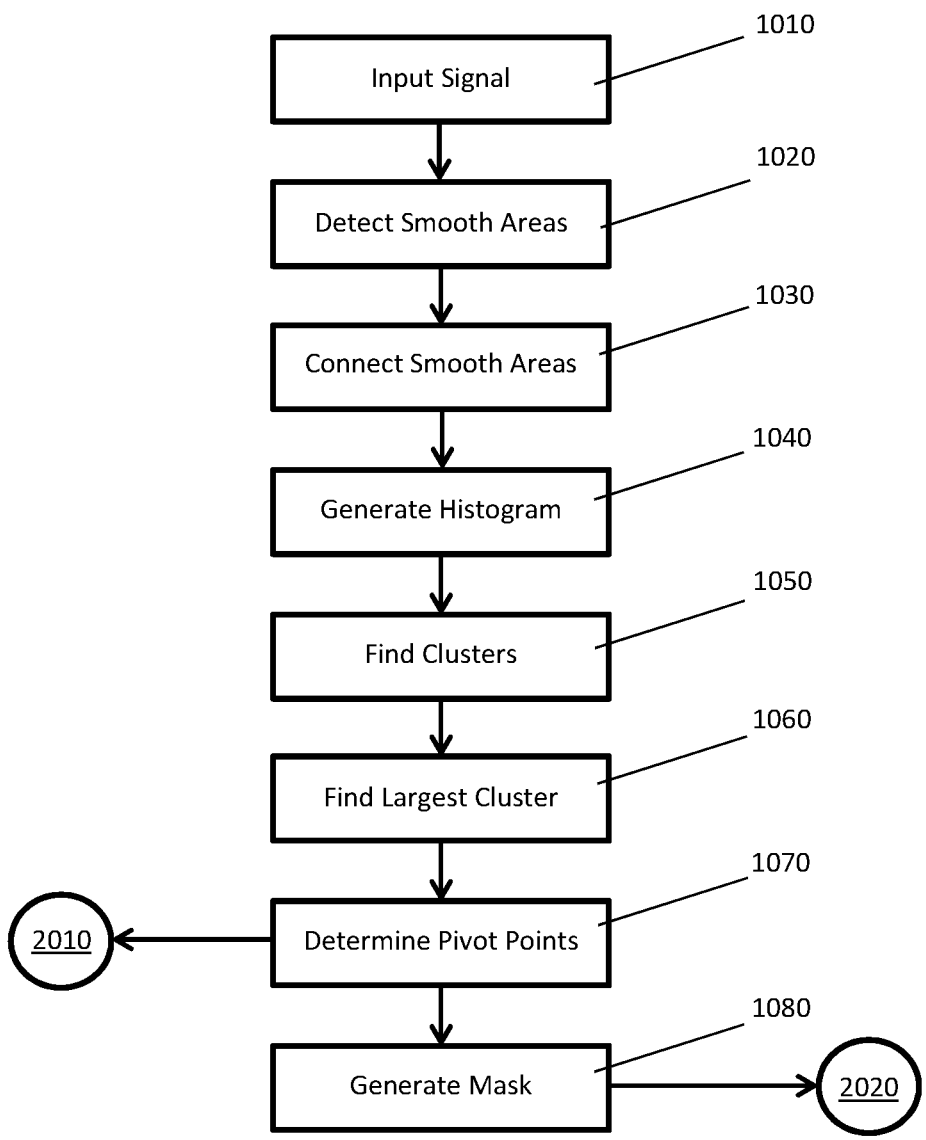
FIG. 10 illustrates an example method to generate a mask used to create an enhanced bit depth codeword.

FIG. 10 shows a flowchart of an example of the process of creating a mask for enhancing (increasing) the bit-depth of a lower dynamic range (e.g., SDR) input video signal. After the signal is input (1010), smooth areas of the codeword can be detected (1020). These smooth areas can have holes removed (1030) by, for example, the application of one or more morphological operators. Then a histogram of the non-zero pixels can be generated (1040) and clusters within the histogram can be found (1050). Of these clusters, at least one largest cluster can be determined (1060). Alternatively, a particular cluster from the clusters can be selected on different criteria other than size, and more than one cluster can be selected. From the selected cluster or clusters, pivot points can be found (1070) that delineate particular areas of the pixels. These pivot points can also be used to control the prediction process (2010). Those pivot points can also be used to generate a mask (1080) to help generate the residual (2020) and segregate which areas are to be given a higher bit depth in order to reduce banding effects in those areas in the final image.

Figure 11:
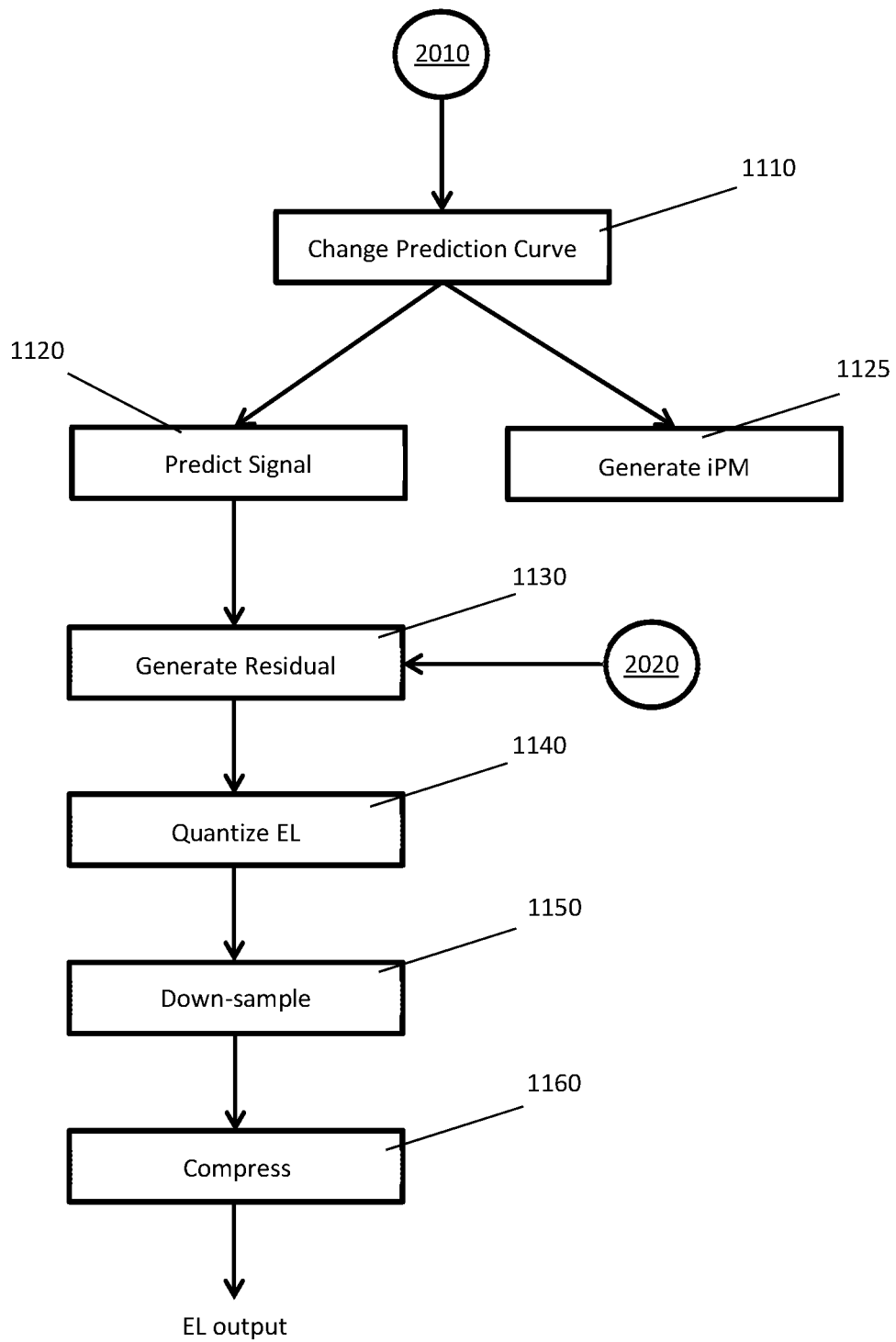
FIG. 11 illustrates an example prediction process to create an enhancement layer according to an embodiment.

FIG. 11 shows a flowchart depicting an example process of prediction used to create the enhancement layer. Determined pivot points (2010) can be used to modify the prediction curve (1110). This new curve can be used to generate a clipped predicted higher bit-depth signal (1120) and to generate interlayer prediction metadata (1125). A residual can then be encoded (1130) from the prediction (1120) and a mask (2020). This residual can then be quantized (1140), down-sampled (1150), and/or compressed (1160).

Figure 12:
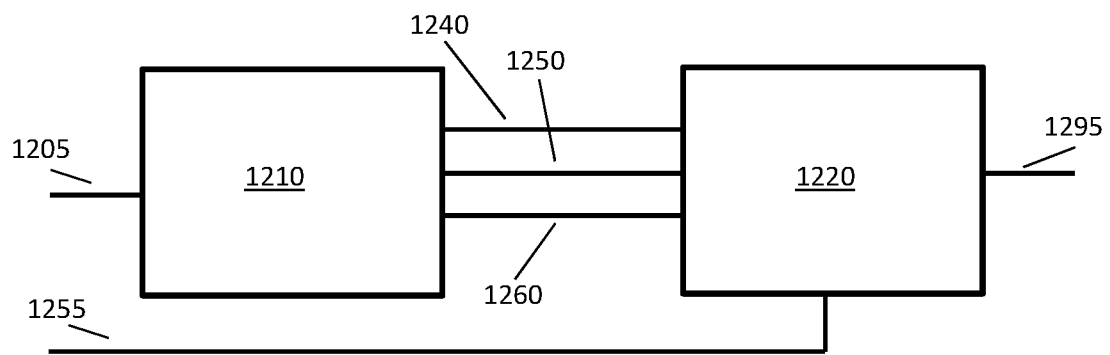
FIG. 12 illustrates an example encoder/decoder system for the CRA method.

FIG. 12 shows an example encoder/decoder system for the CRA method. An SDR input (1205) is encoded by the encoder (1210). This can be, for example, a 16-bit SDR, where the encoder (1210) creates an 8-bit resolution SDR from the 16-bit SDR. In another embodiment, an 8-bit SDR can be generated outside the encoder, and the input (1205) is actually two inputs, one for the original 16-bit SDR and another for the derived 8-bit SDR. The encoder (1210) can create an enhancement layer output (1240), a base layer output (1260), and an interlayer prediction metadata output (1250) using a CRA method. These outputs (1240, 1250, 1260) can be transmitted to a decoder (1220). The decoder (1220) can then use the enhancement layer data (1240), the base layer data (1260), and the interlayer prediction metadata (1250) to enhance the SDR bit depth by using the CRA method. Inverse display management metadata (1255) can be used by the decoder (1220) to generate an EDR output (1295).

CONCLUSION

In this document, we propose a codeword range amplification method to overcome the low bit depth issue in the inverse DM application. The codeword range amplification selects a codeword range of interest and enforce them to a constant values via the prediction function. Then, the difference between the original high bit depth SDR and this constant value is encoded in EL, which has more codewords than its original range. Thus, we can enhance the video quality related to bit depth, such as alleviating the banding artifact. We also propose a clipping threshold selection algorithm so the parameters can be selected automatically. We have tested the proposed solutions in two full-length video sequences and observed the proposed method significantly improve the quality compared to 8-bit video only.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A method to enhance the bit depth of a video signal, said method comprising:
receiving a first standard dynamic range (SDR) video signal;
receiving a second SDR video signal derived from the first SDR video signal, the second SDR video signal having a lower bit-depth than the first SDR video signal;
determining a low codeword threshold Sl and/or a high codeword threshold Sh that bounds an entire codeword range of an area of interest within the second SDR video signal, wherein determining the low codeword threshold Sl and/or the high codeword threshold Sh comprises detecting and connecting smooth areas in the second SDR video signal, wherein connecting the smooth areas comprises using at least one morphological operator, calculating a histogram of non-zero pixels in the smooth areas, and collecting clusters in the histogram;
generating a predicted SDR video signal from the second SDR video signal, wherein all codewords within the determined codeword range are set to a constant codeword value based on the determined low codeword threshold Sl and/or the determined high codeword threshold Sh;
generating a mask that selects the codeword values below the low codeword threshold Sl and/or above the high codeword threshold Sh;
encoding the difference between the first SDR video signal and the predicted SDR video signal, masked with the generated mask, into an enhancement layer;
generating interlayer predictor metadata from the second SDR video signal; and
generating a base layer from the second SDR video signal; and
thus providing the enhancement layer, the interlayer predictor metadata, and the base layer for decoding.

2. The method of claim 1, further comprising:
transmitting the enhancement layer, the interlayer predictor metadata, and the base layer to a decoder; and
generating, at the decoder, an enhanced SDR video signal based on the base layer, enhancement layer, and interlayer predictor metadata.

3. The method of claim 1, wherein the high codeword threshold Sh bounds a bright area of interest and the low codeword threshold Sl bounds a dark area of interest.

4. The method of claim 1, further comprising:
determining a largest cluster of the clusters; and
wherein the determining the low codeword threshold Sl and/or the high codeword threshold Sh comprises selecting pivot points of the largest cluster.

5. The method of claim 1, wherein the generating the enhancement layer further comprises non-linear de-quantization of the enhancement layer and prediction of the base layer.

6. The method of claim 1, further comprising encoding differences between further selected areas of interest and further constants based on further determined codeword thresholds into multiple enhancement layers.

7. An encoder, configured to perform the method of claim 1, said encoder comprising:
a prediction engine configured to create the interlayer predictor metadata and the predicted signal;
a mask module configured to create the mask;
a residual module providing a residual between the first SDR video signal and the predicted signal;
a mask application module configured to apply the mask to the residual to create a masked residual; and
a quantizer taking the masked residual and the interlayer predictor metadata to produce an enhancement layer.

8. The encoder of claim 7, further comprising a base layer compression module connected to a base layer decompression module, the base layer compression module providing base layer output for the encoder and the base layer decompression module providing input for the prediction engine and the mask module.

9. The encoder of claim 7, wherein the quantizer is a non-linear quantizer.

10. The encoder of claim 7, further comprising an enhancement layer compression module taking input from the output of the quantizer.

11. The encoder of claim 10, further comprising a downsampling module between the quantizer and the enhancement layer compression module.

12. A method for producing an enhanced video signal from a standard dynamic range (SDR) video signal, said method comprising:
producing a lower bit depth SDR video signal from the SDR video signal;
producing a predicted SDR video signal by clipping the lower bit depth SDR video signal at a determined pixel location, wherein the step of clipping comprises clipping codewords in the lower bit depth SDR below a low codeword threshold Sl to a first constant codeword value and/or clipping codewords in the lower bit depth SDR exceeding a high codeword threshold Sh to a second constant codeword value, wherein determining the determined pixel location comprises detecting and connecting smooth areas in the lower bit depth SDR video signal, wherein connecting the smooth areas comprises using at least one morphological operator, calculating a histogram of non-zero pixels in the smooth areas, and collecting clusters in the histogram;
forming a residual mask with respect to the determined pixel location;
applying the residual mask to a residual of the SDR video signal and the predicted SDR video signal, producing a masked residual; and
producing an enhancement layer by quantizing the masked residual; and
producing the enhanced video signal by combining the predicted SDR video signal with the masked residual.

13. A system for enhancing the bit depth of an input SDR video signal, the system comprising:
an encoder taking as input the input SDR video signal, and providing an enhancement layer, a base layer, and interlayer predictor metadata; and
a decoder taking as input the enhancement layer, the base layer, and the interlayer predictor metadata, and providing an enhanced bit depth SDR video signal, and applying SDR to EDR conversion of the enhanced bit depth SDR signal, wherein the SDR video signal is derived from a higher bit-depth SDR video signal, and wherein the encoder is configured to:
determining a low codeword threshold Sl and/or a high codeword threshold Sh that bounds an entire codeword range of an area of interest within the input SDR video signal, wherein determining the low codeword threshold Sl and/or the high codeword threshold Sh comprises detecting and connecting smooth areas in the SDR video signal, wherein connecting the smooth areas comprises using at least one morphological operator, calculating a histogram of non-zero pixels in the smooth areas, and collecting clusters in the histogram;
generating a predicted SDR video signal from the input SDR video signal, wherein all codewords within the determined codeword range are set to a constant codeword value based on the determined low codeword threshold Sl and/or the determined high codeword threshold Sh;
generating a mask that selects the codeword values below the low codeword threshold Sl and/or above the high codeword threshold Sh;
encoding the difference between the higher bit-depth SDR video signal and the predicted SDR video signal, masked with the generated mask, into the enhancement layer;
generating the interlayer predictor metadata from the input SDR video signal; and
generating the base layer from the input SDR video signal.

14. The system of claim 13, wherein the decoder is configured to:
dequantize the enhancement layer using the interlayer predictor metadata;
apply prediction mapping to the base layer using the interlayer predictor metadata;
generate an enhanced bit depth video signal from a combination of the dequantized enhancement layer and the predicted base layer; and
generate an output video signal from inverse display management of the enhanced bit depth video signal, said output video signal being of a higher dynamic range than the input video signal.

* * * * *